Figure 1:
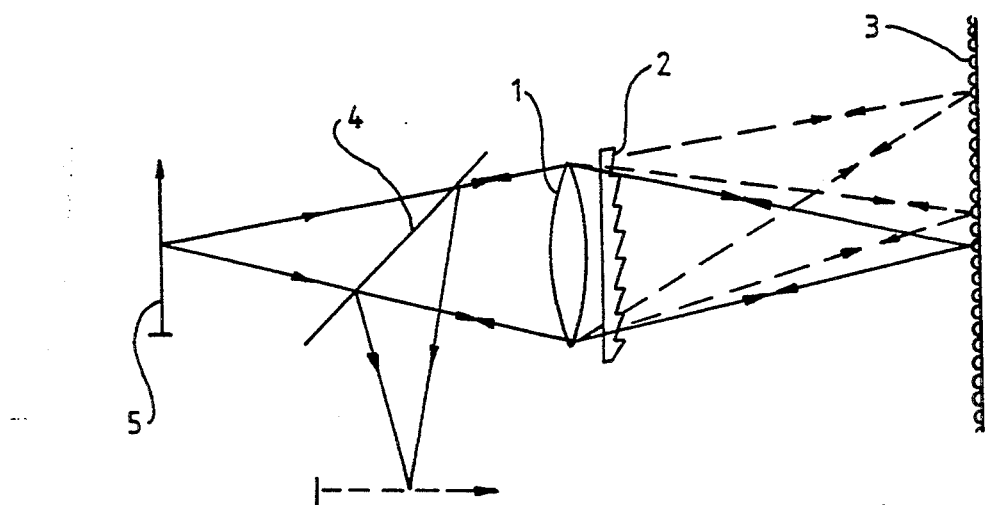

United States Patent
Davies et al.

[11] Patent Number: 5,420,718
[45] Date of Patent: May 30, 1995

[54] OPTICAL IMAGE SYSTEM WITH IMPROVED RESOLUTION

[75] Inventors: Neill Davies, Nr. Goole; Malcolm McCormick, Sheffield; Richard Stevens, Ashford, all of England

[73] Assignee: De Montfort University, Leicester, England

[21] Appl. No.: 917,072

[22] PCT Filed: Feb. 4, 1991

[86] PCT No.: PCT/GB91/00157
§ 371 Date: Sep. 4, 1992
§ 102(e) Date: Sep. 4, 1992

[87] PCT Pub. No.: WO91/11745
PCT Pub. Date: Aug. 8, 1991

[30] Foreign Application Priority Data
Feb. 2, 1990 [GB] United Kingdom ............... 9002327

[51] Int. Cl.$^6$ ............... G02B 27/44; G02B 5/04
[52] U.S. Cl. ................... 359/448; 359/458; 359/566; 359/615; 353/38; 353/81; 354/112; 354/115
[58] Field of Search ............... 359/615, 618, 565, 529, 359/566, 896, 448, 449, 443, 530, 637, 454, 455, 456, 459, 458, 529, 530, 565, 566, 615, 618, 637, 896; 353/38, 81, 98; 356/330, 410, 302, 326, 328, 305; 354/112, 115

[56] References Cited

U.S. PATENT DOCUMENTS

| | | | |
|---|---|---|---|
| 3,657,981 | 4/1972 | Benton | 359/112 |
| 3,901,220 | 8/1975 | Koyasu et al. | 385/117 |
| 4,427,977 | 1/1984 | Carollo et al. | 385/119 |
| 4,552,422 | 11/1985 | Street | 354/112 |
| 4,647,154 | 3/1987 | Birnbach et al. | 350/162.12 |
| 4,660,975 | 4/1987 | Aughton | 356/326 |
| 4,795,262 | 1/1989 | Morris et al. | 356/410 |
| 4,795,654 | 12/1988 | Clarke | 356/330 |

FOREIGN PATENT DOCUMENTS

| | | | |
|---|---|---|---|
| 0171816 | 2/1986 | European Pat. Off. | G11B 7/09 |
| 1622970 | 1/1971 | Germany . | |
| 2842696 | 4/1980 | Germany | G02B 27/00 |
| 998090 | 7/1965 | United Kingdom . | |

Primary Examiner—Loha Ben
Assistant Examiner—John Juba, Jr.
Attorney, Agent, or Firm—Trexler, Bushnell, Giangiorgi & Blackstone, Ltd.

[57] ABSTRACT

The invention relates to optical elements, particularly retro-reflecting, retro-imaging and optical transmission inversion elements to relay a true scale equal conjugate image of a scene. Hitherto, the image had a resolution limit set by the pitch and/or packing density of micro-optical elements to reflect or transmit ray bundles impinging on them, the number of elements within the viewing zone determining the lateral and hence depth resolution in any given direction. The object of the invention is to reduce the effect of micro-screen texture in a relatively inexpensive manner, that provides real-time systems and which can be used with fast moving objects. This objective is met by an optical element comprising a retro-reflecting or auto-collimating transmission screen (9) having one or more lenses (6,10) and an associated means (8,11) of displacing wavelengths to different degrees and whereby to spread a reflected or transmitted image into a spectral streak. The means (8,11) of displacing wavelengths may be a grating, mechanically or optically blazed, or formed from prisms, or may be a diffraction or zone plate.

7 Claims, 1 Drawing Sheet

U.S. Patent

May 30, 1995

5,420,718

OPTICAL IMAGE SYSTEM WITH IMPROVED RESOLUTION

This invention relates to optical elements and is particularly concerned with retro-reflecting, retro-imaging, and optical transmission inversion elements.

An important aspect in the field of the transmission or reflection of images to provide three-dimensional information for viewing or for recordal, is resolution.

All previous systems employing retro-reflecting/retro-imaging or optical transmission inversion screens to relay a true scale equal conjugate image of a scene have a resolution limit set by the pitch and/or packing density of micro-optical elements which retro-reflect or optically transmit the ray bundles impinging on their foremost surfaces. The number of micro elements within the viewing zone determines the lateral and hence the depth resolution in any given direction. Various methods have been described to reduce the effect of the micro-screen texture, but these require either gauged optical networks which are expensive and difficult to align or a physical movement of the micro-screen in the focal plane of a lens or lens array, or the image to be scanned across the micro surface. The latter two methods prevent real-time systems being realised and this reduces a system's usefulness when used with fast moving objects.

The object of the present invention is to provide improved resolution by substantially reducing if not eliminating the effect of micro-screen texture in a relatively simple and cost-effective manner.

According to the present invention, an optical element comprises a retro-reflecting or auto-collimating transmission screen having one or more lenses and an associated means of displacing wavelengths to different degrees and whereby to spread a reflected or transmitted image into a spectral streak. The conventional auto-collimating transmission screen is a back-to-back arrangement of microlens arrays in which the microlenses are aligned and of equal focal length as illustrated. The microlenses are themselves aligned to produce the auto-collimation, so that the combination is afocal.

The displacement means is preferably a grating that may be a blazed grating produced mechanically or optically, or it may be formed by a number of prisms. Equally a diffraction or zone plate could be used and then there is diffraction in all directions.

The use of a displacement means such as a grating or the like in combination with an imaging lens or lenses and the spreading of the projected/transmitted image into a spectral streak over a wide area with displacement of wavelengths to different degrees has the result that the recombined image is the resultant of a number of wavelengths from a number of screen locations each having its own, and different, screen pattern or uniquely displaced pattern, with the most beneficial effect that the original screen pattern is suppressed to a degree sufficient to prevent it from forming any part of the projected or transmitted image.

An important advantage of the optical element of the invention is that because a number of screen locations are used simultaneously, the lateral and hence depth resolution thereby is increased.

For screens with random micro-optical component distribution it need only be necessary to spread the image in one axis perpendicular to the imaging lens/lenses axis/axes, whereas a number of discrete angular displacements could be required to eliminate the screen texture of say a precise honeycomb array where for example images might be displaced in axis at 60° to each other.

Another important advantage of the optical element of the system is that because the lensed image is spread to a number of screen locations simultaneously any localised break in the screen structure or any local obstacle on the screen surface is rendered less visible in the final retro-directed or transmitted image.

Figure 2:
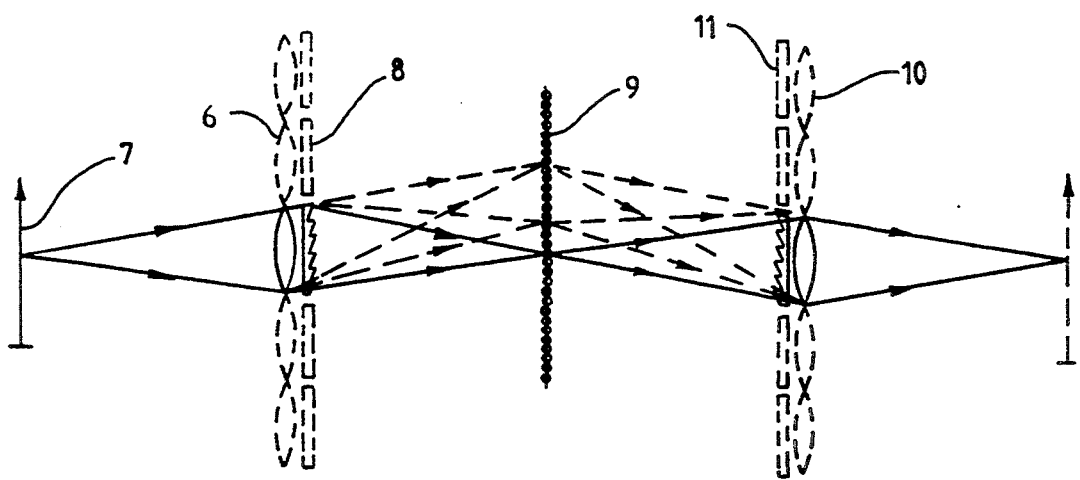

Two embodiments of the invention will now be described by way of example with reference to the accompanying diagrammatic drawings, in which:

FIG. 1 shows an optical reflective system embodying the optical element of the invention; and FIG. 2 shows an optical transmission system embodying optical elements in accordance with the invention.

In FIG. 1, an optical reflective system is shown schematically, having an imaging lens 1 and an associated blazed grating 2, a reflector 3 having a micro-optical reflective surface and a beam splitter 4 located between the imaging lens 1 and the object 5. Incoming radiation from the object is gathered by the lens 1 and focussed on the reflector 3, and by virtue of the passage of the radiation through the grating, the image of the object is spread over a large area of the reflector 3. The grating displaces different wavelengths of the radiation to different degrees and such that the wavelengths impinge on the reflector as a spectral streak. Therefore, the reflected image focussed by the lens by way of the beam splitter 4 at a viewing point or the position of a means of recording the reflected image is the resultant of a number of wavelengths reflected from the same number of different screen locations, each having its own and different screen pattern, or its own and uniquely displaced pattern. As a direct result, there is a major suppression of the original screen pattern to such an extent that it does not remain visible in the reflected image.

It will be appreciated that whilst for simplicity a single imaging lens is shown, the same effect would occur with each lens of an in-line multi-lens system or with a two-dimensional array of lenses, with a still greater suppression of screen pattern consequent upon the number of lenses each projecting an image of part of the object on to the screen, with each projected part-image impinging on the screen as a spectral smear.

In FIG. 2, an optical transmission system is shown schematically, having a first array of lenses 6 towards an object 7, with an associated blazed grating 8 overlaying the array to the side away from the object. Beyond the lenses 6 and grating 8, in the direction of radiation, a micro-optical transmission screen 9 is provided, and on to which the lenses 6 each focus a part of the object. The provision of the grating results in each image impinging on the transmission screen being spread over a large area, the grating displacing different wavelengths emerging from each lens to different degrees and such that they impinge on the transmission screen as a spectral streak.

From the transmission screen each image part is transmitted to the corresponding lens of a second lens array 10 in front of which is an associated second blazed grating 11. Each lens gathers its image part and focusses the reconstituted image at a point of viewing or a point of recording of the transmitted image.

As with the reflective system of FIG. 1, the result of the transmissive system of FIG. 2 is to cause a major suppression of the transmission screen pattern to such an extent that it does not remain visible in the reconstituted transmitted image.

Therefore, one important result of the invention is to provide reflected or transmitted images that have enhanced resolution both laterally and in depth. Another important result is that any localised flaw in the reflective or the transmission screen or any local obstacle in the radiation path from the object to the reflective or the transmission screen is rendered considerably less visible than in systems known hitherto, as a consequence of the spreading of the image as a spectral streak on the reflective or transmission screen and such that the reflected or transmitted image emanates from a relatively large number of screen locations.

We claim:

1. An optical system of retro-reflecting, retro-imaging or optical transmission inversion arrangement providing three-dimensional information for viewing or recordal, comprising a retro-reflecting or optical transmission screen and one or more lenses to focus an image of an object on the screen, wherein optically dispersive means is provided associated with the lens or lenses to deflect radiation of different wavelengths emanating therefrom to different degrees, whereby to spread an image from the lens or lenses on said screen as a spectral streak.

2. An optical system as in claim 1, further comprising beam splitter means (4) for directing a reconstituted image focussed by the one or more lenses at a point of viewing or recording of the reconstituted image.

3. An optical system comprising an optical transmission screen (9), a first lens group comprising one or more lenses (6) between the transmission screen (9) and an object (7), and a second lens group comprising one or more lenses (10) between the transmission screen (9) and a point of reconstitution of an image, wherein beyond the one or more lenses (6) of said first lens group in the direction of radiation, an optically dispersive means (8) is provided to deflect radiation of different wavelengths emanating from said one or more lenses (6) of said first lens group to different degrees and whereby to spread an image from each said lens of said first lens group on the transmission screen as a spectral streak, and there being in advance of each lens (10) of said second lens group a means (11) to reconstitute each spectral streak to provide a reconstituted image focussed by the one or more lenses (10) of said second lens group at a point of viewing or a point of recording of the reconstituted image.

4. An optical system as in any one of claims 1 to 3, wherein the optically dispersive means is a grating.

5. An optical system as in claim 4, wherein the grating is a blazed grating.

6. An optical system as in claim 4, wherein the grating is formed by prismatic means for displacing the radiation of different wavelengths to differing locations.

7. An optical system as in any one of claims 1 to 3, wherein the optically dispersive means is a diffraction or zone plate.

* * * * *